United States Patent
Schilles

(10) Patent No.: US 8,056,951 B2
(45) Date of Patent: Nov. 15, 2011

(54) INTERIOR FITMENT PART OF A VEHICLE, MOTOR VEHICLE DOOR WITH AN INTERIOR FITMENT PART AND METHOD FOR THE PRODUCTION OF AN INTERIOR FITMENT PART

(75) Inventor: Wilfried Schilles, Kandel (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 41 days.

(21) Appl. No.: 12/448,767

(22) PCT Filed: Jan. 8, 2008

(86) PCT No.: PCT/EP2008/000076
§ 371 (c)(1),
(2), (4) Date: Jul. 17, 2009

(87) PCT Pub. No.: WO2008/083946
PCT Pub. Date: Jul. 17, 2008

(65) Prior Publication Data
US 2010/0072769 A1    Mar. 25, 2010

(30) Foreign Application Priority Data

Jan. 8, 2007 (DE) .......................... 10 2007 001 224

(51) Int. Cl.
*B60R 13/02* (2006.01)
*B60R 7/04* (2006.01)
(52) U.S. Cl. ................... 296/37.13; 296/146.7; 296/37.8
(58) Field of Classification Search ............... 296/146.1, 296/146.7, 39.1, 153, 37.1, 37.8, 37.13, 214, 296/1.02, 1.08, 1.09
See application file for complete search history.

(56) References Cited

U.S. PATENT DOCUMENTS 4,986,865 A    1/1991   Fujii
(Continued)

FOREIGN PATENT DOCUMENTS

DE          40 07 829        10/1990
(Continued)

OTHER PUBLICATIONS

International Search Report.

*Primary Examiner* — Glenn Dayoan
*Assistant Examiner* — Gregory Blankenship
(74) *Attorney, Agent, or Firm* — Collard & Roe, P.C.

(57) ABSTRACT

Disclosed is an interior fitting part for a vehicle, comprising a wall part (12) that has a first side (21) facing the interior (IR) in the properly mounted state thereof, an opposite second side (22), and an edge (23) that extends between the sides. The interior fitting part further comprises a decorative layer (30) that is arranged on the wall part (12). An edge section of the decorative layer (30) is folded onto the second side (22). The second side (22) of the wall part (12) is provided with at least two elevations (41, 42), at least some sections of which extend next to one another along the edge (23), from the perspective of the edge (23). The decorative layer (30) is folded from the first side (21) to the second side (22) via the edge (23) while an edge section (31) of the decorative layer (30) extends between two elevations (41, 42) on the second side (22). Also disclosed are a motor vehicle door comprising an interior fitting part as well as a method for producing an interior fitting part.

12 Claims, 3 Drawing Sheets

U.S. PATENT DOCUMENTS

Figure 1:
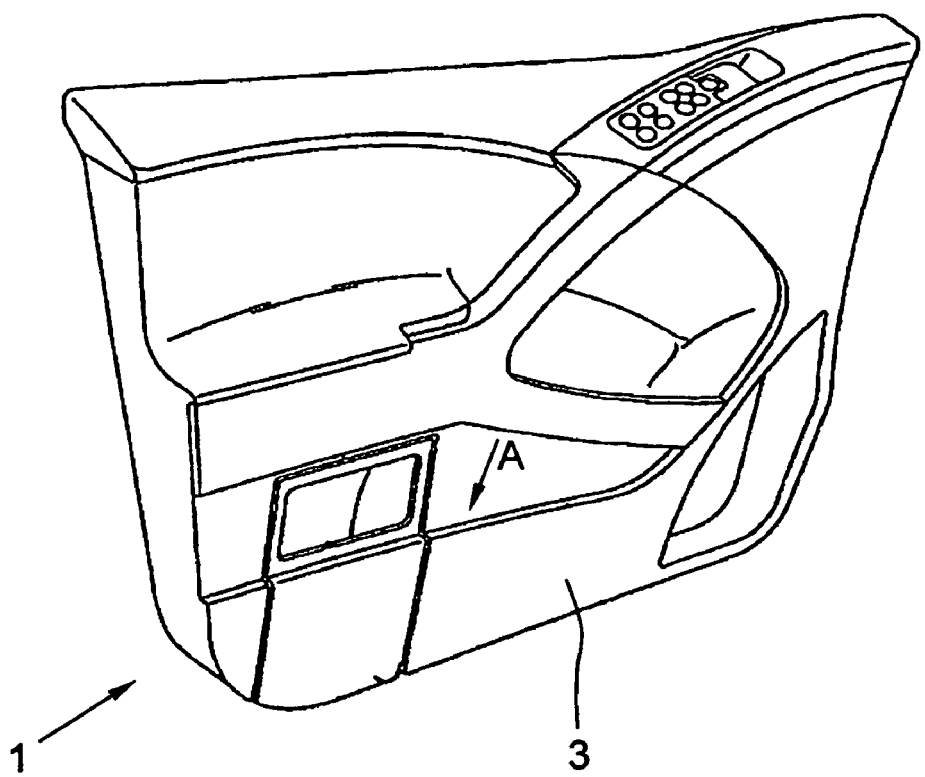

| | | | |
|---|---|---|---|
| 5,833,304 A * | 11/1998 | Daniel et al. | 296/214 |
| 6,161,889 A * | 12/2000 | Davis et al. | 296/39.1 |
| 6,177,155 B1 * | 1/2001 | Kurosaki | 428/31 |
| 7,044,533 B2 * | 5/2006 | Dry et al. | 296/146.5 |
| 7,255,391 B2 * | 8/2007 | Bristow et al. | 296/214 |
| 7,311,936 B2 * | 12/2007 | Niimi | 427/71 |
| 7,332,207 B2 * | 2/2008 | Bondar et al. | 428/71 |
| 7,513,344 B2 * | 4/2009 | Toccalino et al. | 188/371 |
| 7,658,426 B2 * | 2/2010 | Hayakawa et al. | 296/39.1 |
| 2010/0072769 A1 * | 3/2010 | Schilles | 296/37.13 |

FOREIGN PATENT DOCUMENTS

| | | |
|---|---|---|
| DE | 42 23 446 | 1/1994 |
| DE | 43 17 234 | 12/1994 |
| DE | 195 39 273 | 4/1997 |
| DE | 101 62 096 | 7/2003 |
| DE | 102 11 615 | 9/2003 |
| DE | 103 33 161 | 2/2005 |
| JP | 61-098643 | 5/1986 |

* cited by examiner

INTERIOR FITMENT PART OF A VEHICLE, MOTOR VEHICLE DOOR WITH AN INTERIOR FITMENT PART AND METHOD FOR THE PRODUCTION OF AN INTERIOR FITMENT PART

CROSS REFERENCE TO RELATED APPLICATIONS

This application is the National Stage of PCT/EP2008/000076 filed on Jan. 8, 2008, which claims priority under 35 U.S.C. §119 of German Application No. 10 2007 001 224.3 filed on Jan. 8, 2007. The international application under PCT article 21(2) was not published in English.

The invention relates to an interior fitment part of a vehicle, such as for example an interior lining part, a seat rear wall, a receiving container or a storage compartment in the side door, a ceiling lining panel or a roof liner, a door lining panel, a lining panel for the rear storage compartment or a part of these interior lining parts. The invention also relates to a motor vehicle door with such an interior fitment part. The invention further relates to a method for the production of such an interior fitment part.

The solution according to the invention can be used generally in interior lining parts of a motor vehicle, which usually have a decorative layer, and preferably in interior linings of motor vehicle doors or in fixed side linings.

Receiving containers in inner linings of motor vehicles, in particular in motor vehicle doors, belong to the standard fittings in modern motor vehicles. These receiving containers, such as map pockets for example, are generally fixed, upwardly open compartments.

For reasons of space, the receiving containers according to the prior art are often placed in the door disadvantageously in the lower region of the door lining and are only accessible to the user with difficulty. Through multiple use, the edges of such containers become worn, so that the vehicle interior has an adverse overall impression with regard to taste.

From DE 42 23 446 A1 a laminated vehicle interior fitment part is known, in which the edge of the laminated sheet on the rear side of the fitment part is held by clamping between a wall and a tooth. Here, a gluing of the edge is not provided, because contamination of the component by the adhesion process due to excess adhesive is to be avoided.

In addition, from DE 102 11 615 A1 a storage compartment for a door interior lining is known, which has a carrier body with an inner shell and an outer shell, which is applied on the side facing the interior thereon. The outer shell and the inner shell have respectively a decorative layer and rib parts respectively facing each other, which on placement of the outer shell onto the inner shell are connected with each other by material connection with the formation of a rib connecting the outer shell with the inner shell. Here, for the formation of a fold-back, an end section of the decorative layer of the outer shell is guided around its edge and clamped between outer shell and inner shell.

From DE 40 07 829 A1 a method is known for the production of a ceiling lining panel for a motor vehicle, which is formed from a substrate and a covering layer applied on its front side. A fold-back is formed with an edge section of the covering layer, in which the edge section is placed onto the rear side of the substrate of the felt and is fastened by means of an adhesion connection.

The object of the invention is to provide an interior fitment part of a motor vehicle with a decorative layer, a motor vehicle door with such an interior fitment part and a method for the production of such an interior fitment part, which is favorably designed with regard to wear. In particular, the interior fitment part can be an interior lining part or a map pocket.

The problem is solved by the features of the independent claims. Further example embodiments are indicated in the sub-claims which refer back thereto.

According to the invention, the following is provided: an interior fitment part of a vehicle with a wall part which with an installation thereof in accordance with the provisions has a first side facing an interior and a second side situated opposed thereto, and an edge extending between these, and with a decorative layer arranged thereon, wherein:

- an edge section of the decorative layer is folded over onto the second side,
- the second side of the wall part comprises at least two elevations running at least partially, viewed from the edge, adjacent to each other and along the edge,
- the decorative layer is folded over from the first side over the edge onto the second side and an edge section of the decorative layer extends between two elevations on the second side.

The path of the edge of the edge section of the decorative layer extends here between two elevations, along the longitudinal direction, in which the elevations extend.

The second side of the wall part, which is covered in sections by the decorative layer, can be an exposed area here.

The edge section can lie here in particular between: a front elevation, which is the second elevation or an elevation following this, viewed from the edge, and an elevation following this, viewed from the edge.

Provision can be made here that the decorative layer spans the at least one depression between the first and the front elevation.

In an example embodiment, at least three elevations can be provided which at least partially viewed from the edge run adjacent to each other and along the edge, wherein the edge section of the decorative layer extends in the depression between the second and the third elevation. Here, in addition, the decorative layer can span the depression between the first and the second elevation.

The elevations can be parts of an insert which is able to be placed onto the carrier part. Alternatively, the elevations can be produced integrally with the wall part.

The elevations can be formed on the second side such that the height of the elevations decreases from the contour surface of the second side of the wall part, viewed from the edge and transversely thereto.

The wall part can be the side wall of a map pocket of a vehicle side door or another compartment, facing the interior.

The decorative layer can be formed from leather. In addition, the decorative layer can be glued on the wall part.

According to the invention, a motor vehicle door is provided with an interior fitment part according to one of the described embodiments.

Furthermore, according to the invention a method is provided for the production of such an interior fitment part with a wall part with a carrier part, which has in particular: with an installation thereof in accordance with the provisions a first side facing an interior and a second side situated opposed thereto, and an edge extending between these, and with a decorative layer arranged thereon. The production method has in particular the steps:

- forming the inner fitment part with the wall part and the decorative layer by means of a press forming tool with two tool parts which respectively have a shaping deformation surface,
- folding over the projecting section of the decorative layer, to be folded over from the first side (21) onto the second side, initially projecting on the first side, folded over onto the second side, and pressing the projecting section onto the second side, introducing a tool part into the depression in which the edge section of the component which is to be produced is to be situated, and pressing the corresponding region of the decorative layer into the depression, introducing a blade into the respective depression and cutting the decorative layer such that the edge section which is produced through the cutting process is situated in the respective depression.

Figure 2:
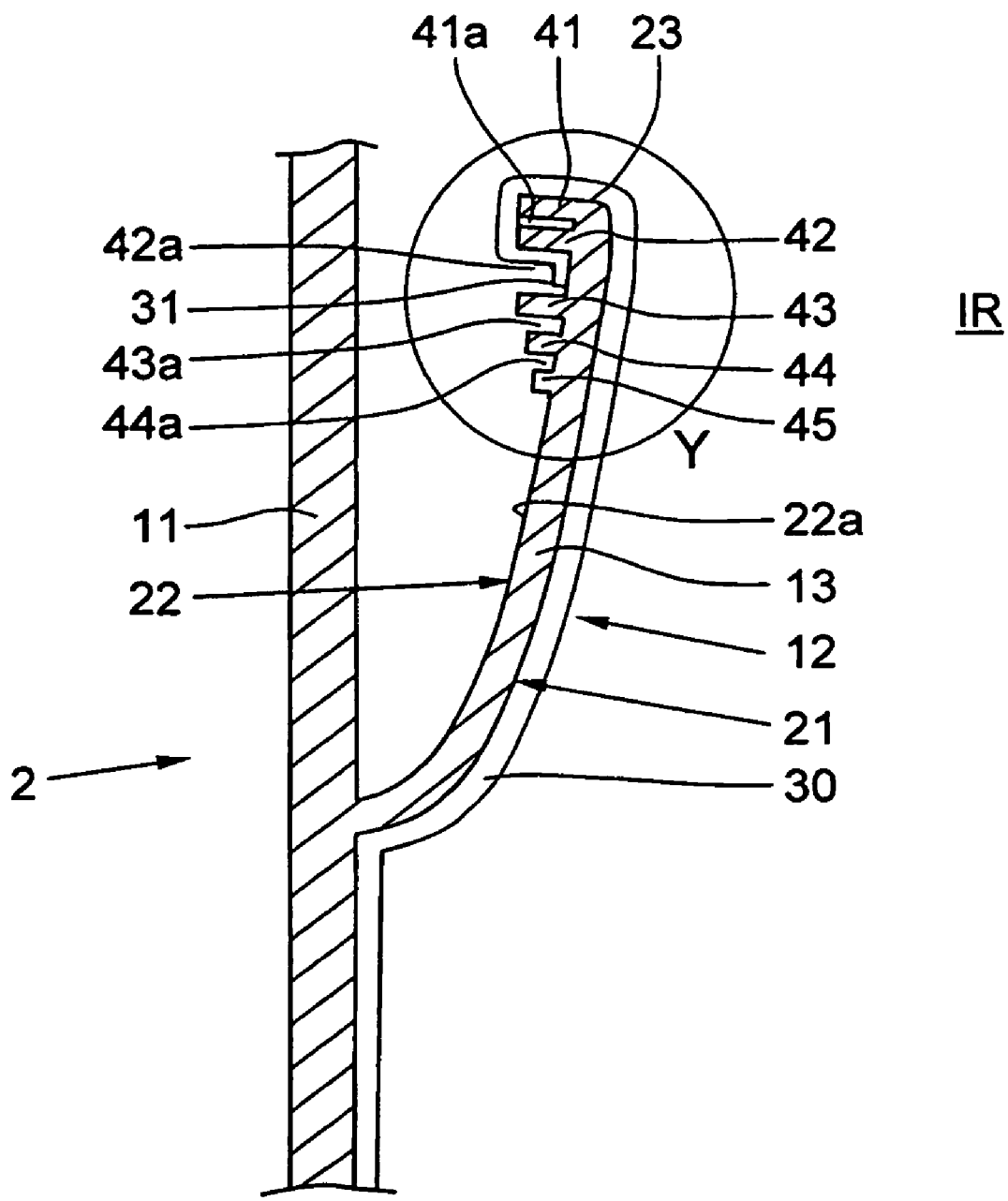
Figure 3:
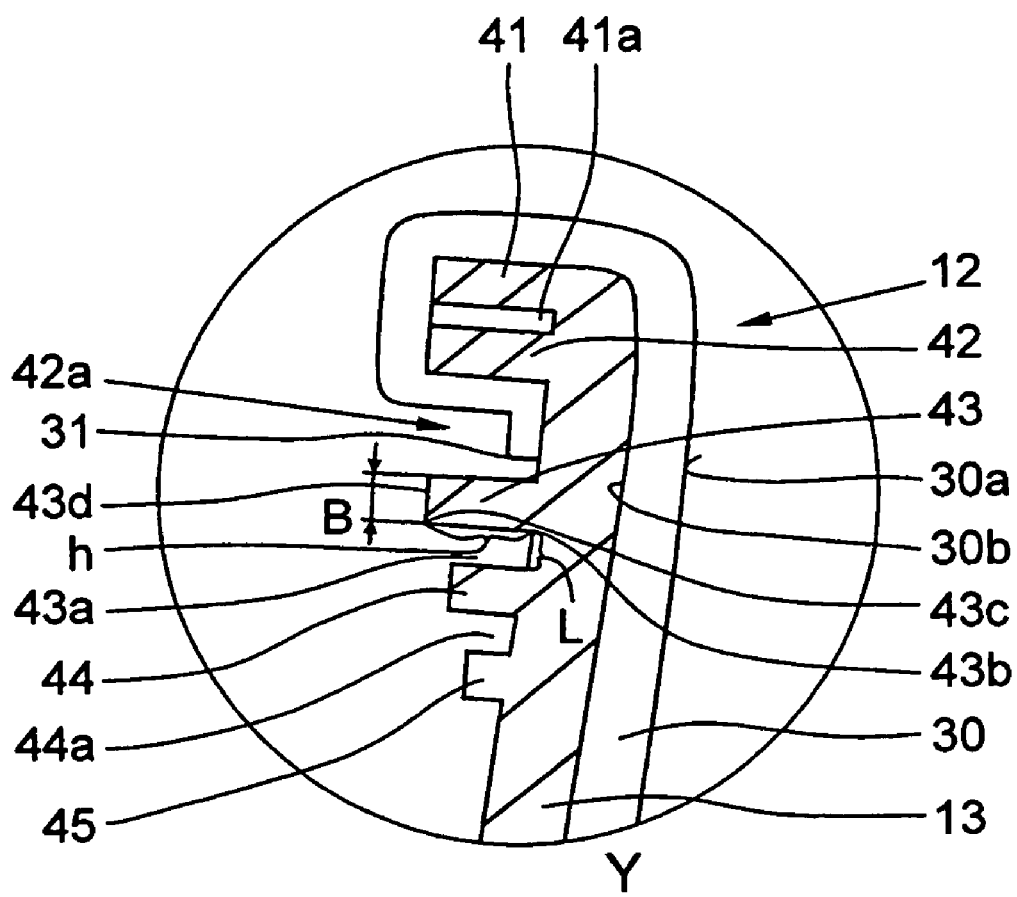

The inventions are described below with the aid of the enclosed figures, which show:

FIG. 1 a diagrammatic perspective illustration of a motor vehicle door with interior fitment parts, viewed from the interior;

FIG. 2 a sectional illustration of a map pocket as example embodiment of the interior fitment part according to the invention;

FIG. 3 a detail view of the illustration of FIG. 2.

The invention generally relates to an interior fitment part and in particular an interior fitment part of a motor vehicle and in particular the map pocket of the side door of a vehicle or a partial piece of such a map pocket. Here, the interior fitment part according to the invention can also be a seat rear wall, a receiving container or a storage compartment in the side door, a ceiling lining panel or a roof liner, a door lining panel, a lining panel for the rear storage compartment or a part of these interior fitment parts. The following description of the invention with the aid of a map pocket of a vehicle side door is therefore general for interior fitment parts or interior fitment parts of a vehicle.

Motor vehicle doors (FIG. 1, reference 1) are formed from an outer panel or an outer facing and an inner panel or frame element, on which a door inner lining is mounted. The door inner panel constitutes the boundary of the wet space in the direction towards the interior of the motor vehicle. On the door inner panel or the frame element, a module carrier is provided in the form of a sheet on which components such as a window runner, the door lock, window-lift motors or a wiring harness are fastened. The module carrier is screwed or riveted here onto the frame element.

The interior fitment part is formed from a carrier part 2 and usually has a map pocket 3 which is shown in FIG. 2 as a diagrammatic sectional illustration. To form the map pocket 3, the carrier part 2 has a base part 11 and a wall part 12 in the form of a pocket wall 13, which extends out from the base part 11 and projects therefrom, so that between the base part 11 and the wall part 12 a receiving space A is situated, in particular for the storage of objects.

The interior fitment part has a carrier part 2 with a wall part 1, which has a first side 21 and a second side or rear side 22 situated opposed thereto, and also has an edge 23 extending between these. The interior fitment part can be provided in particular in the interior of the motor vehicle such that with the installation in accordance with the provisions into the motor vehicle, it has a first side 21 facing the interior IR and a second side 22 situated opposed thereto, i.e. facing away from the interior IR, and also has the edge 23 extending between these. The edge 23 is part and the outer end of a partially exposed end section of the wall part 12.

The wall part 12 or the pocket wall 13 is covered by a decorative layer 30. The decorative layer 30 covers at least in sections the first side 21 of the wall part 12. The decorative layer can also cover a region of the side of the base part 11 facing the interior IR. According to the invention, the decorative layer 30 extends, viewed in the cross-section of the wall part 12 (FIGS. 2 and 3) from the first side 21 of the carrier part 2 beyond the edge 23 and partially over the second side 22 of the carrier part 2. An edge section of the decorative layer 30 is therefore folded over onto the second side 22 of the carrier part 2.

The side of the wall part facing away from the occupant has at least two elongated elevations or ribs 40 which, viewed from the edge 23, run adjacent to each other and along the edge 23, i.e. parallel or obliquely thereto. Accordingly, a depression or groove is formed between respectively two elongated elevations. In FIGS. 2 and 3 a wall part 12 is illustrated with five elongated elevations 41, 42, 43, 44, 45 with four depressions 41a, 42a, 43a, 44a formed between them. The elevations extend at least partially along the edge 43 and are formed-out pieces of the wall part 12. As an alternative to this, the elevations can be placed, as part of an insert, onto the carrier part or onto a corresponding recess thereof.

According to the invention, the arrangement of the decorative layer 30 is provided such that—starting from the side 21 facing the occupant—it runs at least partially around the edge line 23 and ends with its edge section 31 on the side 22 facing away from the occupant between the two elevations of the majority of elevations. The edge section 31 can lie here in particular between a front elevation, which is the second elevation 42 or an elevation following this, viewed from the edge, and an elevation (e.g. 43) following this, viewed from the edge. The decorative layer 30 has an A surface 30a, which is directed to the outer side, and a B surface 30b, which lies against the wall part 12 and is preferably glued onto the surface of the wall part 12.

The decorative layer 30 is folded over onto the second side 22 from the first side 21 over the edge 23 and an edge section of the decorative layer 30 extends between two elevations on the second side 22. In the illustration of FIGS. 2 and 3, these are the elevations 42 and 43. Here, the decorative layer 30 is shaped such that its edge, when lying on the second side 22 of the wall part 12, runs partially in the depression situated between two elevations.

Through this feature according to the invention, it is achieved that with a normal use of the map pocket, or generally of the interior fitment part with the wall part 12, the edge section 31 of the decorative layer 30 lying between the two elevations is not touched. Thereby, the risk that the decorative layer detaches itself at its edge region from the wall part 12 and hence from the interior fitment part owing to a manual touching of the outer edge region of the wall part 12 often occurring with a use of the interior fitment part, is minimized.

The elevations run at an angle or parallel along a section of the edge 41 of the wall part 12 and rise, viewed in cross-section of the wall part 12, from the course of a contour surface 22a of the second side 22 of the wall part 12.

In an example embodiment of the invention, for the provided cases of application the size of the depression (for example the depression 42a below) in which the edge section 31 of the decorative layer 30 runs, and the height h of the elevation 42 which, viewed from the depression, is situated closer to the edge 23, provision can be made that the height h by which the respective elevation 41, 42, 43, 44, 45 rises from the contour surface 22a of the wall part 12, is 1.0 times to 1.5 times the width of the respective elevation of the wall part 12 adjacent to the respective depression. To determine the height h of the elevation, preferably here the distance of the edge 43b lying at the depression up to the edge 43c of the upper side 43d of the elevation 43 at the side of the respective depression 43a is used. Furthermore, the contour surface 22a, viewed in cross-section, i.e. transversely to the longitudinal direction of the edge 23 or of the elevations, can be regarded as an imaginary line intersecting the elevations.

In this or an alternative example embodiment, the length L of the depression running transversely to the longitudinal direction of the edge 23 or of the elevations is between 5 mm and 9 mm and/or the height of the elevation is between 4 mm to 20 mm. The length L of the depression is preferably determined on the line or curve which cuts perpendicularly the edge lines on the upper side (e.g. the edge 23d).

The elevations can be designed such that the height h of each elevation over the contour surface 22a of the second side 22 of the wall part 12 reduces from elevation to elevation from the edge 23, i.e. viewed transversely thereto. This applies including the first elevation and at least from the second elevation. In special applications, the reduction of the heights h of the elevations can only occur from an elevation situated further behind, viewed from the edge 23, as long as the reduction is still realized with at least the elevations.

Generally, the above-mentioned measurement values are measured in a central region of the edge and of the elevations.

The second side 22 of the wall part 12, which is covered in sections by the decorative layer 30, is preferably an exposed area, i.e. the wall part 12 is not provided with a further layer or cover covering the decorative layer 30 on the second side 22 of the wall part 12.

In a further example embodiment, the decorative layer 30 spans the depression 41a between the first 41 and the second 42 elevation, viewed from the edge 23 of the wall part 12 (direction of view of FIGS. 2 and 3). Furthermore, the decorative layer 30 can span all depressions of the elevations which are situated between the edge 23 of the wall part 12 and the edge section 31 of the decorative layer 30. As an alternative to this, some or all of the elevations can be covered on the second side 22 by a shell part or another cover.

At least three elevations are provided, which at least partially, viewed from the edge 23, run adjacent to each other and along the edge 23.

The carrier part and in particular the wall part 12, in so far as is necessary for a deformation-resistant design of the interior lining part and in particular of the receiving container, is formed from a firm, deformation-resistant material. This can be, for example, a plastic known to the specialist in the art, suitable for an injection molding process for its production. Coming into consideration as plastic material here are for example polypropylene PP, a mixture of PP and EPDM (PP/EPDM T20), ABS (acrylonitrile-butadiene-styrene-copolymer plastic), ABS-PC (ABS with polycarbonate components) or PA (polyamide) and generally thermoplastic plastics. Also, a natural fiber material with reinforcement parts such as plastic material or wood fiber material or a metal can be used as material for the carrier part.

The decorative layer 30 can be formed from one layer or from several layers and is preferably glued onto the carrier part. The decorative layer can be provided in particular to provide haptic characteristics of the end product or of the interior fitment part on its outer side, which correspond to predetermined requirements.

In an example embodiment, the decorative layer is formed in two layers. In the formation of the decorative layer from two or more than two layers, the decorative layer can have a cover layer and a foam layer lying therebeneath, viewed from the visible side. In an example embodiment, the cover layer is formed from PVC or from TPO or from a combination of these materials, and the foam layer is formed from PVC, PP, PE, a soft insert layer of polyester or from a combination of these materials. Also, a foam building up on polyurethane (PU) can be used for the foam layer. For example, the decorative layer can be a composite of textile materials, a foam and a non-woven material.

Also, a textile fabric, a foam artificial leather, a plastic sheet or a leather can be used for the decorative layer. These materials can form a single layer of the decorative layer or a cover layer of a multi-layered decorative layer. With the use of a textile fabric as decorative layer, the textile fabric or a sheet or a combination of the two can be used as the starting material.

The cover layer can have in particular a thickness of 0.3 mm to 0.7 mm and the foam layer can have a thickness of 0.7 mm to 2.5 mm.

The wall part does not have to be a part projecting from a base part, but rather can be part of the base part, when it has a side 21, facing an assumed occupant, a side 22 facing away from the occupant, and an edge line 23 facing the occupant.

The base part can, for example be the shelf of a storage compartment arranged under the glove box or a compartment in the glove box. Preferably, the side 22 facing away from the occupant is a side of the wall part which he does not see in a normal sitting position. Generally, therefore, the side of the base part facing away from the occupant has at least two elongated elevations which run along the edge line, and the decorative layer runs at least partially around the edge line, from the side facing the occupant, and ends on the side facing away from the occupant between two elevations.

The production of the interior fitment part according to the invention can take place as follows: The interior fitment part is formed by means of a press-forming tool with two tool parts which respectively have a shaping deformation surface, and the projecting section of the decorative layer 30 to be folded over from the first side 21 onto the second side 22, firstly projecting on the first side 21, is folded over onto the second side 22, and is pressed onto the second side 22. The folding over can take place by the provision of a corresponding underpressure in the press-forming tool, through the projecting section being drawn into the press-forming tool, and/or by engaging with a special tool. After the folding over, a tool part or a die moves into the depression, in which the edge section 31 of the component which is to be produced is to be situated, and presses the corresponding region of the decorative layer 30 into the depression. A blade then moves into this depression and cuts the decorative layer 30 such that the latter ends on the second side 22 such that the edge section 31, produced by the cutting process, is situated in the respective depression. The blade can be arranged on the tool part or on the die such that the blade moves through it, in order to carry out the cutting process for the formation of the edge section 31. Alternatively, the blade can be part of a cutting device, so that the tool part or a die firstly has to be moved out from the depression and only then is the blade actuated and the depression is entered.

The invention claimed is:

1. An interior fitment part of a vehicle comprising a base part and a wall part extending from the base part to form a receiving space accessible to a vehicle occupant for storage of objects in the receiving space, wherein the wall part has a first side facing the interior of the vehicle and a second side situated opposed thereto, and an edge extending between these, and a decorative layer arranged on the wall part, wherein an edge section of the decorative layer is folded over onto the second side, wherein the second side has at least two elongated ribs, which run adjacent to each other and along the edge, and define a depression between the elongated ribs, wherein a folded over section of the decorative layer that is folded over the edge onto the second side has an edge section that ends in the depression between two ribs such that the edge section runs along a base of the depression between two ribs leaving a gap free between the edge section and an inner surface of an adjacent rib facing the edge section, the ribs configured to have heights and spacing such that the edge section of the decorative layer in the depression between two ribs is not touched during normal use of the interior fitment part as a receiving space.

2. The interior fitment part according to claim 1, wherein the decorative layer is glued onto the wall part and/or is pressed by means of a press-forming tool onto the wall part.

3. The interior fitment part according to claim 1, wherein a height with respect to a contour surface of the second side of the wall part, of a rib which forms the depression in which the edge section of the decorative layer runs, and which is situated closer to the edge than a second rib which forms the depression, is 1.0 times to 1.5 times the width of the depression between the ribs along the contour surface of the second side of the wall part.

4. The interior fitment part according to claim 1, wherein a length of the depression running transversely to a longitudinal section of one of the ribs defining the depression, in which the edge section of the decorative layer runs, is between 5 mm and 9 mm and/or a height of the rib is between 4 mm to 20 mm.

5. The interior fitment part according to claim 1, wherein the edge section lies in the depression between: a front rib which is a second rib, viewed from the edge, and a rib following this, viewed from the edge.

6. The interior fitment part according to claim 5, wherein the decorative layer spans at least one depression between a first rib and the front rib.

7. The interior fitment part according to claim 1, wherein at least three ribs are provided which, viewed from the edge run adjacent to each other and along the edge, and the edge section of the decorative layer extends in a depression between a second and a third rib as viewed from the edge.

8. The interior fitment part according to claim 7, wherein the decorative layer spans a depression between a first rib and the second rib as viewed from the edge.

9. The interior fitment part according to claim 1, wherein the heights of ribs from a contour surface of the second side of the wall part decrease with distance of the ribs from the edge.

10. The interior fitment part according to claim 1, wherein the wall part is the side wall, facing the interior, of a map pocket of a vehicle side door or of another compartment accessible to a vehicle occupant for storage of objects.

11. The interior fitment part according to claim 1, wherein the decorative layer is formed from leather.

12. A vehicle door with an interior fitment part according to claim 1.

* * * * *